March 17, 1970  R. A. SILVERNAIL  3,500,895

RETRACTABLE CANOPY MECHANISM

Filed March 11, 1968

INVENTOR.
ROBERT A. SILVERNAIL
BY
Teare, Teare & Sammon
ATTORNEYS

United States Patent Office 3,500,895
Patented Mar. 17, 1970

3,500,895
RETRACTABLE CANOPY MECHANISM
Robert A. Silvernail, 17254 Valley Road,
Mantua, Ohio 44255
Filed Mar. 11, 1968, Ser. No. 712,071
Int. Cl. E06b *3/94;* B60j *7/06*
U.S. Cl. 160—84     3 Claims

ABSTRACT OF THE DISCLOSURE

A canopy mechanism for use with an open top vehicle and including a pair of lengthwise extending trackways and a plurality of horizontally extending support members which span the open top of the vehicle body, and adapted for sliding movement on the trackways. A cover member is attached to the support members at spaced intervals lengthwise of the vehicle. Guide arms extends downwardly from the support members for guiding the support members lengthwise along the trackways. A reversible drive mechanism is connected to certain of the support members for selectively moving the support members toward and away from one another to retract and extend the cover member, respectively.

BACKGROUND OF THE INVENTION

The present invention relates to covers for open top vehicle bodies, such as trucks or the like, and more particularly to covers which are mechanically retractable and extendable.

Conventionally, trucks having open top cartage compartments have been provided with flexible cover members which have been loosely draped over the open top of the cartage compartment to cover and protect the contents of the vehicle, or to prevent the contents from being blown or otherwise undesirably dispelled from the cartage compartment. Heretofore, the flexible cover members were usually tarpaulins which were manually extended or retracted resulting in an inefficient, cumbersome and time consuming operation. In addition, as the cover members were often quite heavy, more than one operator was required to carry out the covering and uncovering operation.

SUMMARY OF THE INVENTION

The present invention contemplates providing a mechanically operated canopy mechanism for selectively covering and uncovering a cartage compartment of a vehicle, such as a truck or the like, comprising, a plurality of laterally spaced support members which extend transversely of the open top of the vehicle, and a flexible cover member which is attached at spaced intervals to the support members. A track means is mounted on the vehicle which extends lengthwise thereof for movably supporting the support members. A guide means is disposed for operable coaction with the support members for guiding the movements of the support members with respect to the track means. A drive means is operably connected to the support members and is adapted for selectively moving the support members toward and away from one another for retracting and extending the cover member with respect to the open top. The drive means includes a reversible drive mechanism which is operably connected to one of the respective support members for moving the respective support members toward and away from one another. The guide means includes a pair of elongated arm members which extend downwardly along side the trackways and are adapted to prevent transverse shifting of the support members on the track means, and block-like members fixedly connected to the guide arms which are adapted for reciprocal movement interiorly of the track means to limit vertical movement of the support members with respect to the track means.

The foregoing arrangement provides a canopy mechanism which is of simple construction, and which is automatically, quickly and easily operated to remove and extend a cover member. Furthermore, the operation may be accomplished by a single operator resulting in a substantial savings in time and energy. In addition, the foregoing arrangement provides for continuous positive securement of a cover member to the vehicle, and eliminates the necessity of attaching and detaching the cover before and after each use.

BRIEF DESCRIPTION OF THE DRAWINGS

FIG. 1 is a side elevation view of the canopy mechanism of the present invention shown mounted on a vehicle, such as a truck or the like;

DESCRIPTION OF THE PREFERRED EMBODIMENT

Figure 1:
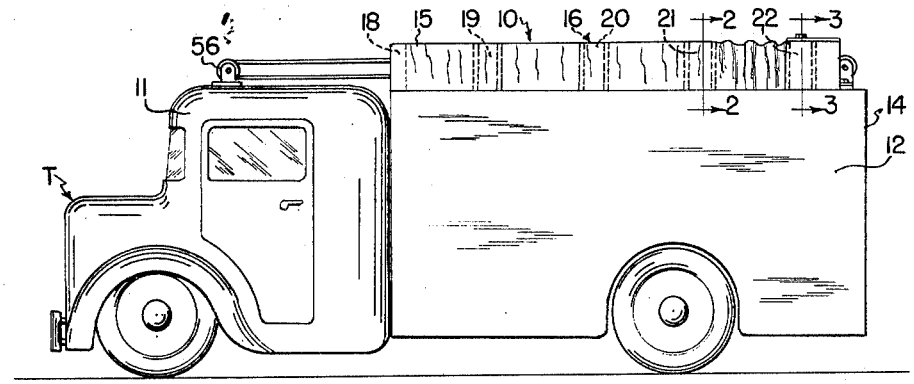
Figure 2:
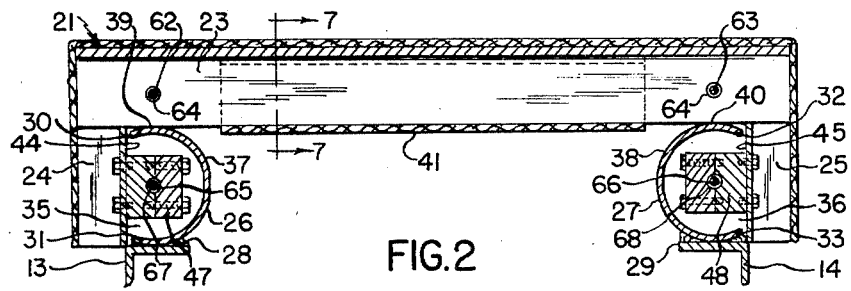
FIG. 2 is an enlarged cross sectional view taken along the lines 2—2 of FIG. 1.

Referring again to the drawings, there is illustrated generally at 10 in FIG. 1, a retractable canopy mechanism of the present invention which is adapted for use with a vehicle, such as a truck T, having a cab portion 11 and an open top cartage compartment 12 which is defined by a pair of upstanding side walls 13 and 14 (FIG. 2). As shown in FIG. 1, the canopy mechanism 10 includes a flexible cover member 15 which is arranged to span the open top of the cartage compartment 12, and which is supported by a bridging means, such as at 16, which extends between the side walls 13 and 14, and is adapted for lateral movement back and forth across the top of the cartage compartment 12 to selectively retract and extend the cover member 15.

In the form shown, the bridging means 16 comprises a plurality of laterally spaced support members 18 to 22 which are adapted for relative movement with respect to one another. The support members 18 to 22 may be made of any suitable rigid material, but in the form shown are preferably made of channel iron or the like, and are essentially identical in configuration. For the purpose of illustration, however, only one support member, such as 21, will be described in detail. As shown in FIG. 2, the support member 21 is of a generally inverted U-shaped configuration, when viewed in transverse cross section, having a generally horizontally extending crossbar 23 which extends between the walls 13 and 14 and is arranged to support a pair of downwardly extending guide arms 24 and 25. Such arms are disposed adjacent the opposite ends of the crossbar 23 for guiding it laterally during movement across the open top of the cartage compartment 12. Referring again to FIG. 1, the forward-most support member 18 may be fixedly attached to the side walls 13 and 14 adjacent the front end of the cartage compartment 12, such as by welding or the like, while the remaining support members 19 to 22 are mounted for relative movement with respect to one another.

To support the movable members 19 to 22, there is provided a pair of rigid trackways 26 and 27 which extend lengthwise along the upper marginal ends 28 and 29 of the side walls 13 and 14, respectively. In the form shown, the trackways 26 and 27 are of a generally C-shaped configuration when viewed in transverse cross section (FIG. 2) having generally parallel, spaced apart edges 30, 31 and 32, 33 which define a pair of lengthwise extending oppositely facing slots 35 and 36, respectively. The trackways 26 and 27 preferably include curved outer surfaces 37 and 38, respectively, which are adapted for sliding engagement with the crossbars 23 of the respective support members, as at 39 and 40, and are fixedly attached at the lower end to the upper marginal ends 28 and 29 of the side walls 13 and 14, respectively.

Figure 7:
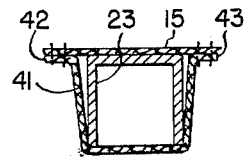
FIG. 7 is a cross sectional view taken along the lines 7—7 of FIG. 2.

The cover member 15 preferably extends substantially the full length of the cartage compartment 12, and may be made of any suitable material, such as canvas or the like. The cover 15 is preferably fixedly attached to each of the respective support members 18 to 22 at generally equally spaced intervals along its length being attached adjacent the front end to the forward-most support member 18 and adjacent the rear end to the rearward-most support member 22. The attachment may be made in any suitable manner, but in the form shown, is accomplished by means of a flap member, such as at 41 (FIGS. 2 and 7) which is disposed in overlapping relations around the crossbar 23. As shown, the flap 41 has opposed ends 42 and 43 attachably connected to the cover member 15 on opposite sides of the crossbar 23, such as by stitching or the like. Thus, the cover member 15 can be pulled forwardly or rearwardly as desired.

To limit the transverse shifting movement and guide the crossbars 23 along the trackways 26 and 27, the crossbars 23 are preferably of a sufficient length so that the guide arms 24 and 25 extend downwardly along side and outwardly of the trackways 26 and 27 with the confronting surfaces 44 and 45 spaced slightly apart so that the arms 24 and 25 will engage the trackways 26 and 27, respectively, upon any excessive transverse widthwise movement of the cross bars 23 with respect to the cartage compartment 12.

To further guide the movable support members 19 to 22, each of the support members may be provided with a pair of guide blocks 47 and 48 which may be fixedly mounted on the guide arms 24 and 25 and which are arranged to project inwardly in a direction toward one another. In the form shown, the blocks 47 and 48 are preferably rectangular in cross section (FIG. 2) and may be made of any suitable rigid material, such as metal or the like. Preferably, the blocks 47 and 48 are positioned to extend through the slots 35 and 36 and into the hollow interior of the trackways 26 and 27 for lengthwise movement therein. The transverse height of the blocks 47 and 48 is preferably less than the transverse distance between the respective edges 30, 31 and 32, 33 of the trackways 26 and 27, respectively, so that the blocks 47 and 48 can be moved freely upon extension and retraction of the cover. Furthermore, by such an arrangement, the blocks 47 and 48 will engage the upper edges 30 and 32, respectively, upon any excessive vertical movement of the support members 19 to 22 with respect to the trackways 26 and 27, and thus, preventing the respective support members from being lifted off the trackways, such as when the vehicle T is in motion and the cover 15 is in the extended position.

Figure 4:
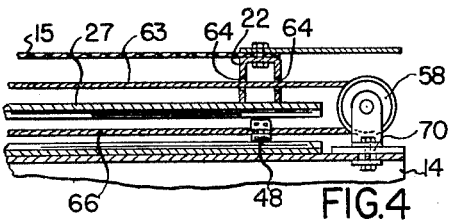
FIG. 4 is a cross sectional view taken along the lines 4—4 of FIG. 3.
Figure 5:
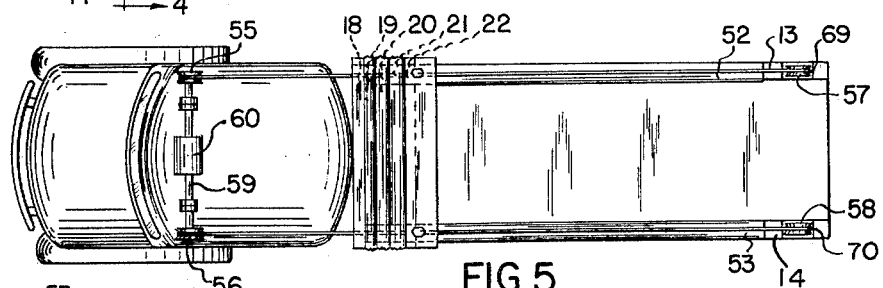
FIG. 5 is a view taken along the lines 5—5 of FIG. 3.
Figure 6:
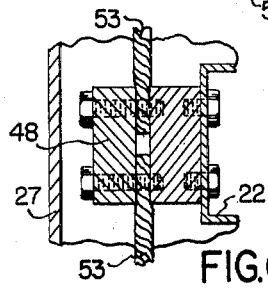
FIG. 6 is a top elevation view of the canopy mechanism of the present invention in the retracted condition.

To extend and retract the cover, the blocks which are attached to the rear end support member 22 are clamped to the opposite free ends of the cables 52 and 53 (FIGS. 4 and 6) which extend lengthwise of the vehicle body and adjacent the upper portion thereof. Each of the cables 52 and 53 extend around a forwardly disposed sheave, such as 55 and 56, respectively, which is shown as being mounted on top of the cab, and a rearwardly disposed sheave 57 and 58, which is shown as being mounted on the upper and rearward end of the vehicle walls 13 and 14, respectively. The forward sheaves 55 and 56 are fixed to a shaft 59 which is journaled in bearings on the top of the cab 11 and is driven by any suitable source of power, such as a reversible electric motor 60.

Figure 3:
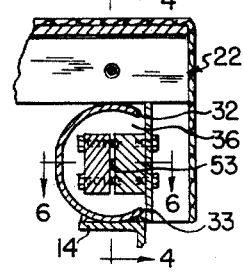
FIG. 3 is an enlarged partial sectional view taken along the lines 3—3 of FIG. 1.

The upper reach 62 and 63 of each cable 52 and 53 passes freely through openings 64 (FIGS. 2 and 3) in the respective support members 18 to 22 while the lower reach 65 and 66 of each cable passes freely through openings 67 and 68 in the guide blocks 47 and 48 on the support members 19 to 21, respectively. The bearing brackets 69 and 70, which support the rearward sheaves 57 and 58, are adjustable with respect to the vehicle walls 13 and 14 so as to maintain the cables in taut condition.

Assuming that the cover 15 is extended, as shown in FIG. 1, then, upon operation of the motor in a direction to move the lower reaches 65 and 66 of the cables 52 and 53 in a forward direction, the rearmost support member 22 will be drawn forwardly until it engages the adjacent support member 21 which will then be pulled forwardly with the support member 22. Continued forward motion will engage the support members successively until the forward-most support member 18 is engaged, whereupon a limit switch (not shown) will stop the flow of current to the motor. Similarily, upon extension of the cover 15, a limit switch (not shown) will stop the motor when the cover has reached the limit of its intended travel. During the retraction operation, the cover, being flexible, will collapse and will be pulled to taut condition during the extending operation.

The terms and expressions which have been used are used as terms of description and not of limitation, and there is no intention in the use of such terms and descriptions of excluding any equivalents of any of the features shown and described, or portions thereof, and it is recognized that various modifications are possible within the scope of the invention claimed.

I claim:

1. An apparatus for covering a vehicle of the type having an open top comprising, a pair of laterally extending oppositely disposed trackways mounted on said vehicle adjacent the opposed sides of said open top, a plurality of laterally spaced, inverted generally U-shaped support members supported entirely by said trackways, said support members including cross bars extending generally horizontally and transversely of said open top and projecting at their opposed ends outwardly beyond said trackways, a flexible cover member attached to said support members, said trackways comprising generally C-shaped channel members having curved outer surfaces, said cross bars disposed in sliding coacting bearing engagement with said curved outer surfaces providing a minimal contact between said support members and said trackways for smooth sliding movement therebetween, a pair of spaced, oppositely disposed guide arm members extending downwardly adjacent the opposed ends of said cross bars and outwardly of said trackways for guiding engagement therewith upon transverse shifting movement of said support members with respect to said open top as said support members move laterally along said trackways, each of said trackways defining an elongated slot extending lengthwise thereof, the respective slots of each of said trackways opening in a direction away from one another and toward said guide arm members, each of said guide arm members including block-like guide members attached thereto adjacent the ends remote from said support members and extending into said slots and adapted for reciprocal movement interiorly of the track means to limit vertical movement of the support members with respect to the trackways, each of said block-like guide members having a transverse dimension less than the corresponding dimension of the respective of said slots and disposed in spaced relation from said trackways when said support members are disposed in bearing engagement with said trackways to enable said block-like guide members to move freely within said slots as said support members move with respect to said trackways, and drive means fixedly connected to the rearwardmost of said support members for moving the other of said support members toward and away from one another for retracting and extending said cover member with respect to said open top.

2. An apparatus in accordance with claim 1, wherein said drive means comprises at least one pair of rotatable members disposed adjacent the opposed ends of said trackways, an endless flexible member entrained in driving relation around said rotatable members and operably connected to the rearwardmost of said support members, and power means operably connected with one of said rotatable members for driving said flexible member.

3. An apparatus in accordance with claim 2, wherein said flexible member is fixedly attached to the block-like guide members associated with the rearwardmost of said support members, and said flexible member being disposed to extend through openings provided in the remainder of said block-like guide members for free movement of said cable with respect thereto upon extension and retraction of said cover member.

References Cited

UNITED STATES PATENTS

| | | | |
|---|---|---|---|
| 1,873,990 | 8/1932 | Alexander | 296—105 |
| 2,029,676 | 2/1936 | Schlicher | 296—105 |
| 2,558,926 | 7/1951 | Bramble | 296—105 |
| 1,602,017 | 10/1926 | Hamilton | 296—105 |
| 1,627,716 | 5/1927 | Teachout | 296—105 |
| 2,469,958 | 5/1949 | Fowler | 296—105 |
| 2,882,091 | 4/1959 | Shield | 296—105 |
| 3,160,436 | 12/1964 | Duddleston | 296—105 |

PETER M. CAUN, Primary Examiner

U.S. Cl. X.R.

135—5; 296—105